4/1/80 XR 4,196,432

United States Patent [19]

Chihara

[11] 4,196,432

[45] Apr. 1, 1980

[54] AC DRIVING MODE AND CIRCUIT FOR AN ELECTRO-OPTICAL DISPLAY

[75] Inventor: Hiroyuki Chihara, Suwa, Japan

[73] Assignee: Kabushiki Kaisha Suwa Seikosha, Tokyo, Japan

[21] Appl. No.: 891,427

[22] Filed: Mar. 29, 1978

[30] Foreign Application Priority Data

Mar. 29, 1977 [JP] Japan .................................. 52-35886

[51] Int. Cl.[2] .................................................. G06F 3/14

[52] U.S. Cl. .................................... 340/784; 350/330; 340/765; 340/811

[58] Field of Search .............. 340/324 R, 324 M, 336, 340/166 EL, 811, 765, 784; 350/330

[56] References Cited

U.S. PATENT DOCUMENTS

| | | | |
|---|---|---|---|
| 3,936,676 | 2/1976 | Fujita | 340/324 M |
| 3,981,004 | 9/1976 | Shimizo et al. | 340/324 M |
| 4,019,178 | 4/1977 | Hashimoto et al. | 340/324 M |
| 4,045,791 | 8/1977 | Fokai et al. | 340/324 M |
| 4,117,475 | 9/1978 | Ebihara et al. | 340/324 M |

*Primary Examiner*—Marshall M. Curtis

*Attorney, Agent, or Firm*—Blum, Kaplan, Friedman, Silberman & Beran

[57] ABSTRACT

A driving circuit for alternately referencing display electrodes to a predetermined potential difference with respect to each other in order to effect AC driving thereof is provided. A first drive circuit is coupled to a common electrode of each display cell for alternately referencing the common electrode between first and second opposite potentials for a predetermined interval of time. A second drive circuit is coupled to a segment electrode defining each display cell for selectively referencing the segment electrode to a potential opposite in polarity to the potential of the common electrode to define a predetermined potential difference between the common electrode and segment electrode to thereby render the display cell visually distinguishable for less than the predetermined interval of time. The second drive circuit is further adapted to reference the segment electrode to the same polarity potential as the common electrode during the remaining portion of the predetermined interval of time to thereby permit the display cell to be discharged during the remaining portion of the predetermined interval of time, and hence reduce the current required to effect AC driving of the display cell.

10 Claims, 18 Drawing Figures

FIG. 3
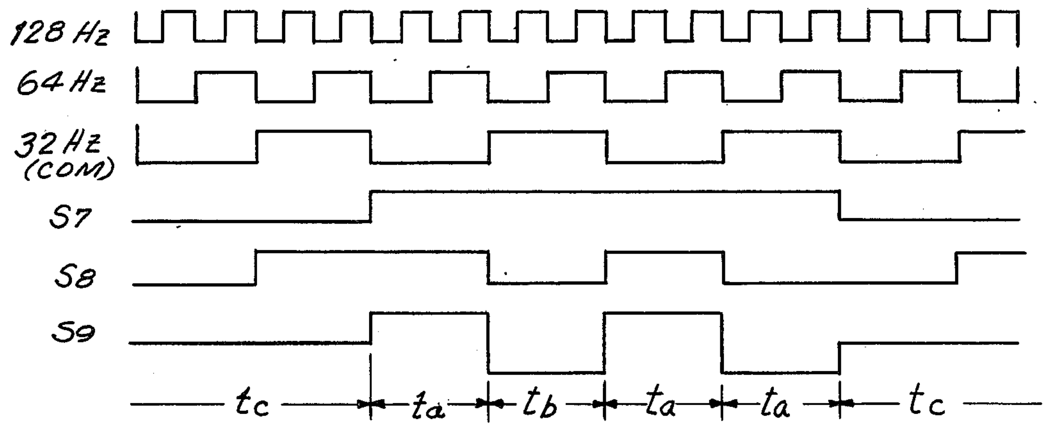
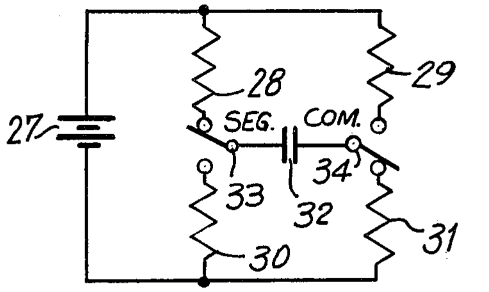
FIG. 4a
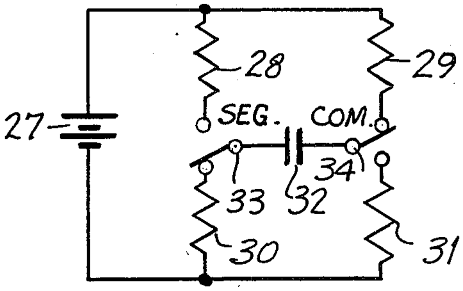
FIG. 4b
FIG. 4c
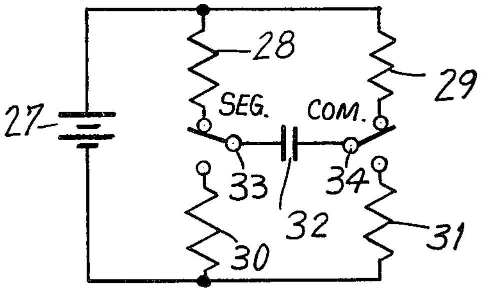
FIG. 4d
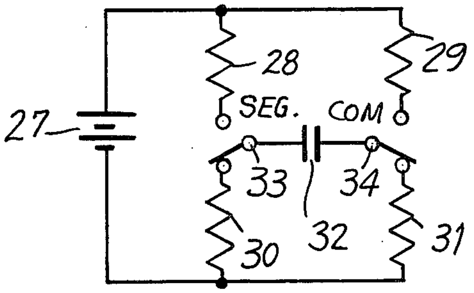

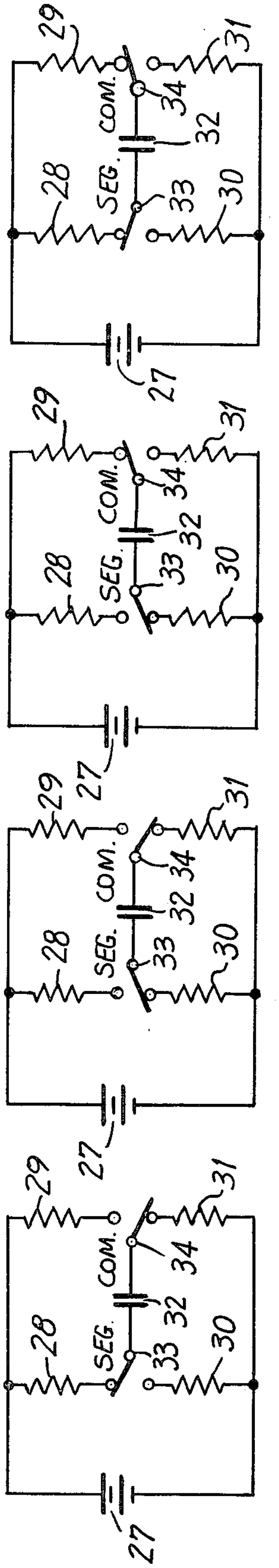
FIG. 5a
FIG. 5b
FIG. 5c
FIG. 5d
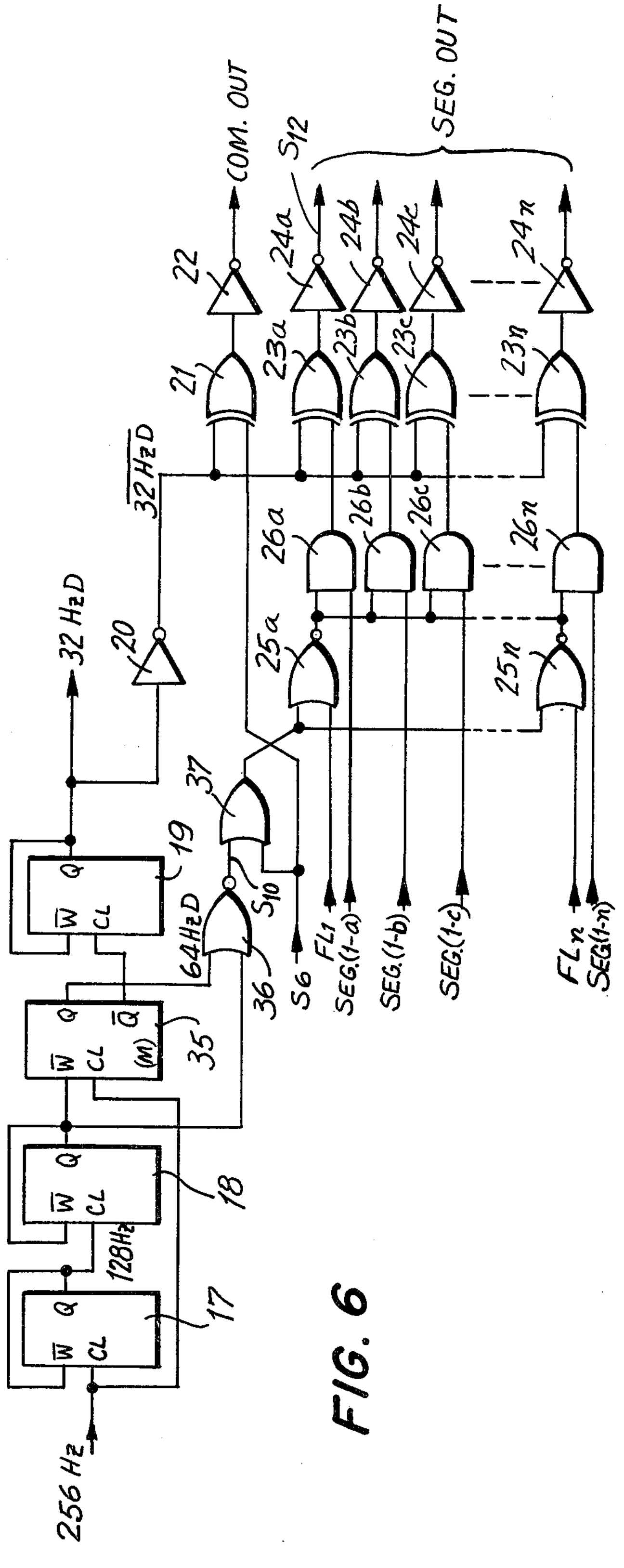
FIG. 6

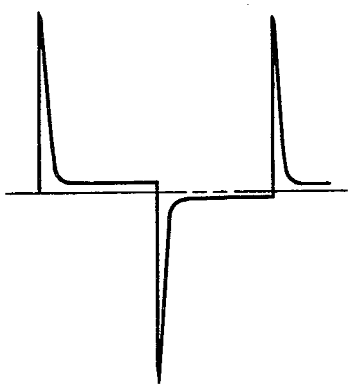
FIG. 10a
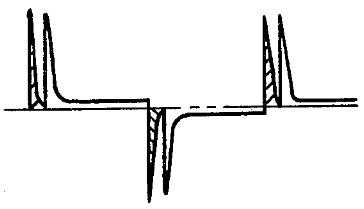
FIG. 10b
FIG. 11
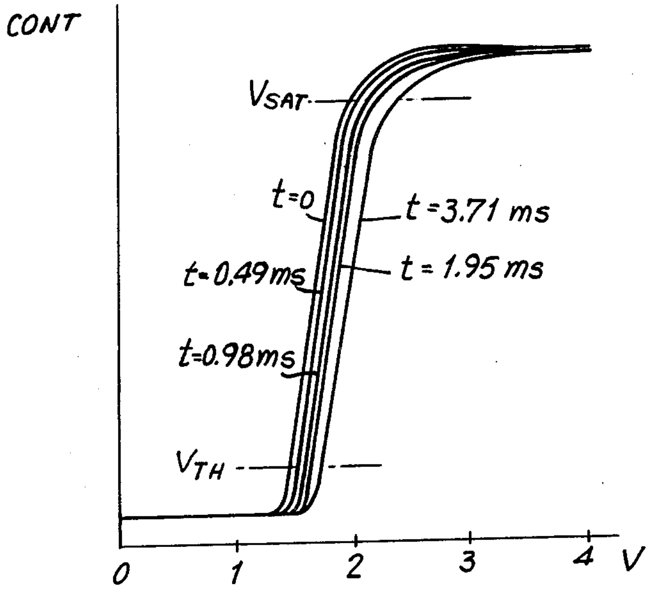

IMPROVED AC DRIVING MODE AND CIRCUIT FOR AN ELECTRO-OPTICAL DISPLAY

BACKGROUND OF THE INVENTION

This invention is directed to an electro-optical display driving circuit, and in particular to a driving circuit capable of effecting AC driving of liquid crystal display cells that admits of reduced power consumption by taking into account the equivalent capacitance of the display cell and permitting the display cell to be discharged prior to each interval that same is rendered visually distinguishable.

In recent years, the most important characteristic of liquid crystals, that has contributed to their widespread use in miniaturized battery driven electronic instruments, is the small amount of current required to render same visually distinguishable. Although liquid crystal electro-optical displays have become very popular, it has been found that as the number of display functions in an electronic instrument increases, a likewise increase in power consumption of the electro-optical display occurs. This is due, in large measure, to the increase in the area of the electrodes comprising the liquid crystal displays.

For example, in electronic wristwatches having a quartz crystal as a time standard, and a liquid crystal electro-optical display, the current consumption of electronic timekeeping circuitry, including the oscillator circuit, divider circuit, etc., is on the order of 1.5 $\mu$A. If the liquid crystal electro-optical display is a simple 6-digit display for displaying only hours, minutes and seconds, the current consumed by the liquid crystal display is on the order of 0.4 $\mu$A when the magnitude of the drive voltage is 3 V (a 1.5 V battery voltage is doubled by a booster circuit). However, when the liquid crystal electro-optical display is driven by the 1.5 V voltage delivered by the battery, the current consumed by the electro-optical display is on the order of 0.8 $\mu$A and represents approximately 35% of the current consumed thereby (1.5 $\mu$A+0.8 $\mu$A=2.3 $\mu$A). Moreover, if the area of the electrodes, comprising each of the electro-optical display cells, is increased in order to add additional display functions to the timepiece such as date, day of the week, year displays, etc., the area of the electrodes can be increased from 0.38 cm$^2$ to 0.62 cm$^2$. In such an event, the current consumed by the digital display would be on the order of 1.4 $\mu$A when the 1.5 V voltage delivered by the battery is utilized to drive the display cells, thereby representing 50% of the total current consumed by the electronic timepiece movement.

Accordingly, in addition to efforts that have been made to reduce the current consumption of the circuitry of electronic instruments having liquid crystal display cells, it would be equally desirable to reduce the current consumed by the liquid crystal display cell. By reducing the current consumed by the liquid crystal display cells, the useful life of the battery can be increased, thereby requiring the battery to be changed less often. It is noted that batteries for wristwatches, that are capable of energizing same for a period of two years, are now being utilized. Furthermore, there have been batteries developed that can drive an electronic wristwatch for a period of five years. Nevertheless, as electronic instruments such as wristwatches, calculators and the like become smaller and lighter, the size of the battery is equally reduced, thereby shortening the life of the battery. Although the useful life of the battery can be lengthened by increasing the size of same, this would be inconsistent with the miniaturization of the instrument that the battery is utilized to energize. Moreover, in small-sized wristwatches and calculators, batteries developed over the last several years have been made even smaller, in order not to detract from the attractiveness and operation of such miniaturized instruments.

It is noted that high performance DC cells such as silver peroxide batteries and lithium batteries, although having a long life, have been less than completely satisfactory because of leakage problems, self-discharge problems and high cost. Accordingly, silver oxide batteries are primarily used in miniaturized electronic instruments. However, it has been found difficult to increase the capacity of a silver oxide battery. Therefore, if an increase in the capacity of a battery cannot be obtained, the current consumption of the electronic instrument must be reduced in order to extend the battery life. A liquid crystal display circuit for driving liquid crystal display cells in a manner to effect a reduction in the current consumed thereby is therefore desired.

SUMMARY OF THE INVENTION

Generally speaking, in accordance with the invention, a driving circuit for an electro-optical liquid crystal display cell that admits of reduced power consumption is provided. Each display cell includes a common electrode, a segment electrode spaced from the common electrode, and visually distinguishable material disposed between the common electrode and the segment electrode. The visually distinguishable material is adapted to become visually distinguishable in response to the common electrode and the display segment electrode being referenced to opposite potentials so that a predetermined potential difference therebetween is defined. A first drive circuit is coupled to the common electrode for alternately referencing the common electrode between a first and second opposite potential for a predetermined period of time and a second drive circuit is coupled to the segment electrode. The second drive circuit is adapted to selectively reference the segment electrode to a potential that is of a polarity opposite to the potential of the common electrode to define a predetermined potential difference between the common electrode and the segment electrode for less than the predetermined interval of time. The second drive circuit is further adapted to reference the segment electrode to the same potential as the common electrode during the remaining portion of the predetermined interval of time to thereby permit the display cell to be discharged during the remaining portion of the predetermined interval of time and thereby reduce the current required to effect the predetermined potential difference between the common electrode and segment electrode required to render visually distinguishable the display cell.

Accordingly, it is an object of the instant invention to provide an improved driving circuit for an electro-optical liquid crystal display.

A further object of the instant invention is to provide a driving circuit for an electro-optical liquid crystal display that utilizes less current to effect a suitable driving of the display.

Still a further object of the instant invention is to provide a driving circuit for effecting an AC drive of a liquid crystal display cell that admits of reduced power consumption.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a wave diagram illustrating the operation of the driving circuit depicted in FIG. 2;

FIGS. 4*a*, 4*b*, 4*c* and 4*d* are equivalent circuits illustrating the operation of the display driving circuit depicted in FIG. 2;

FIGS. 5*a*, 5*b*, 5*c* and 5*d* are equivalent circuit diagrams illustrating the operation of a liquid crystal display driving circuit constructed in accordance with a preferred embodiment of the instant invention;

FIG. 6 is a block circuit diagram of a liquid crystal driving circuit constructed in accordance with a preferred embodiment of the instant invention;

FIG. 10*a* is a current wave form of a liquid crystal display cell driven by the driving circuit depicted in FIG. 2;

FIG. 10*b* is a current wave form of a liquid crystal display cell driven by the driving circuit depicted in FIG. 6; and FIG. 11 is a graphical comparison of the voltage-contrast characteristics of a liquid crystal display cell driven by the driving circuit depicted in FIG. 6.

DETAILED DESCRIPTION OF THE PREFERRED EMBODIMENTS

Figure 1:
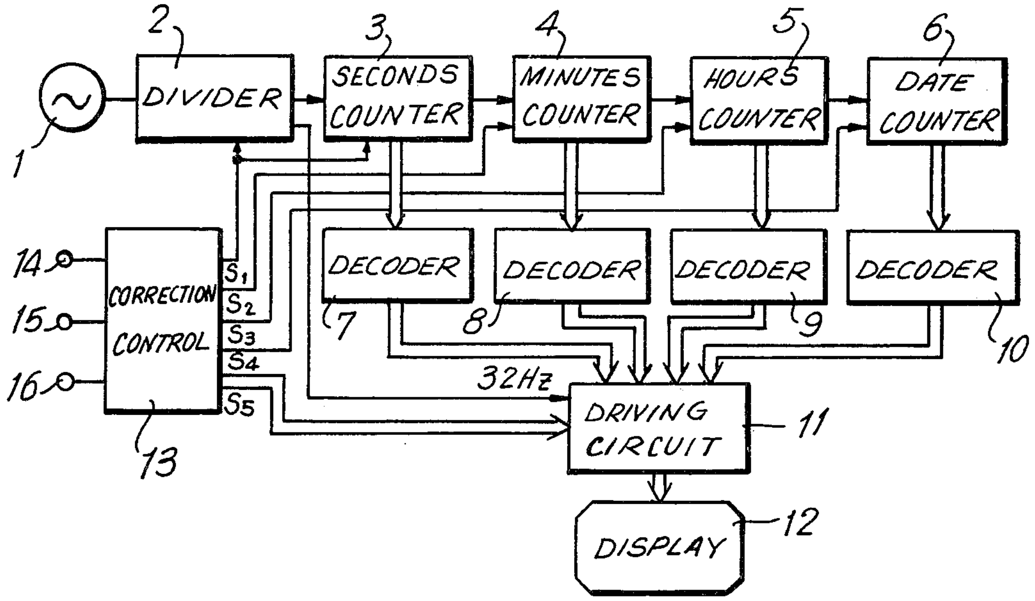
FIG. 1 PRIOR ART
FIG. 1 is a block circuit diagram of an electronic wristwatch constructed in accordance with the prior art.

Reference is now made to FIG. 1, wherein a block circuit diagram of a liquid crystal display electronic wristwatch is depicted. The wristwatch includes an oscilllator circuit 1 having a quartz crystal vibrator as a high frequency time standard for producing a signal having a frequency on the order of $2^{32}$ Hz. The high frequency time standard signal, produced by the oscillator circuit 1, is applied to a divider circuit 2 comprised of a plurality of series-connected divider stages, which divider stages divide down the high frequency time standard signals and apply a low frequency timing signal having a period of one second to a seconds counter 3. Seconds counter 3 is series-coupled to a minutes counter 4, which, in turn, is coupled to an hours counter 5 and a date counter 6 to thereby provide timekeeping signals having a count representative of seconds, minutes, hours and date information. The timekeeping signals, produced by the seconds counter 3, minutes counter 4, hours counter 5 and date counter 6 are respectively applied to decoders 7, 8, 9 and 10. The decoders 7, 8, 9 and 10 are coupled to a driving circuit 11 so that the driving circuit 11 can receive the decoded timekeeping signals and selectively apply same to the liquid crystal display cells to energize same and provide a display of actual time.

A correction circuit 13 includes control switches 14, 15 and 16 for controlling the correction of the wristwatch. To this end, correction signals $S_1$ through $S_4$ are applied to the seconds counter 3, minutes counter 4, hours counter 5 and date counter 6 to respectively effect correction of the timekeeping signals produced by each of these counters. A 1.5 V battery (not shown) is coupled to oscillator circuit 1 and divider circuit 2 to energize same. Additionally, a booster circuit (not shown) is utilized to double the 1.5 V voltage delivered by the battery and effect a driving of the decoder and driving circuits and, additionally, the lower frequency stages of the divider circuits and the counters. Each of the circuits, depicted in FIG. 1, are formed of C-MOS field effect transistors.

It is noted that the liquid crystal electro-optical display 12 is formed of several conventional 7-segmented display digits, each display digit providing a numeric display. The seven display cells forming each digit are comprised of seven segment electrodes spaced apart from a common electrode, with the liquid crystals disposed between the spaced apart electrodes. Accordingly, the liquid crystals are rendered visually distinguishable when the segment electrodes are energized to a potential opposite the potential of the common electrode, to thereby effect a sufficient potential difference therebetween. Moreover, as is detailed below, an AC drive of the liquid crystal display cells is utilized in order to prevent the liquid crystals from deteriorating and in order to further extend the life of the battery. To this end, a 32 Hz drive signal is utilized to synchronize the driving of the liquid crystal display cells and thereby effect a charging and discharging of the liquid crystal display cells.

Figure 2:
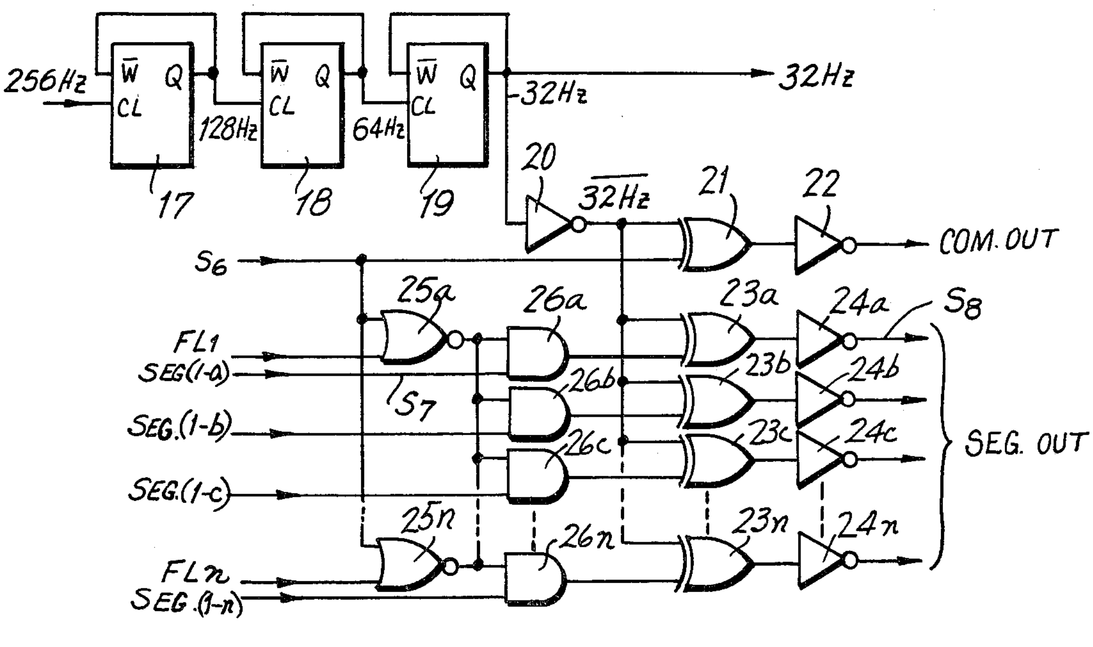
FIG. 2 PRIOR ART
FIG. 2 is a block circuit diagram of a liquid crystal display driving circuit constructed in accordance with the prior art.

Reference is now made to FIG. 2, wherein a block circuit diagram of driving circuit 11 is depicted. Master-slave divider stages 17, 18 and 19 of the divider circuit 2 respectively produce output signals having frequencies of 128 Hz, 64 Hz and 32 Hz. Accordingly, the Q output of divider stage 19 is a 32 Hz signal, which signal, in addition to being applied to the next seriesconnected divider stage in divider circuit 2, is also applied through an inverter 20 to the driving circuit to effect an AC driving thereof.

Specifically, EXCLUSIVE OR gate 21 is coupled to C-MOS driving inverter 22 and is adapted to receive the output $\overline{32\ Hz}$ produced at the output of inverter 20. Depending upon the reference level of the signal $S_6$ applied to the other input of EXCLUSIVE OR gate 21 either the $\overline{32\ Hz}$ signal or the complement thereof is produced as a COMMON OUTPUT signal at the output of inverter 22, and is thereby applied to the common electrode of each display cell. The $\overline{32\ Hz}$ signal produced at the output of inverter 20 is further applied to a first input of EXCLUSIVE OR gates 23*a* through 23*n*. EXCLUSIVE OR gates 23*a* through 23*n* are respectively coupled through C-MOS drive inverters 24*a* through 24*n* to the respective segment electrodes of each display cell in order to effect selective energization of the specific display cells in a manner to be discussed in greater detail below. Specifically, segment drive signals SEG (1-a) through SEG (1-n) are produced by one of the respective decoder circuits 7 through 10 and are applied as a control input to AND gates 26*a* through 26*n*, respectively, in order to effect selective energization of a segment electrode associated therewith. For example, when SEG (1-a) signal is a HIGH level signal, a HIGH level signal is applied at the output of AND gate 26*a*, and thereby applies a HIGH level gating signal to the second input of EXCLUSIVE OR gate 23*a*. EXCLUSIVE OR gate 23*a*, in response to receiving the HIGH level output of AND gate 26*a* and the signal 32 Hz from inverter 20, inverts the $\overline{32\ Hz}$ signal and applies same to a driving inverter 24*a*, wherein same is, once again, inverted so that the 32 Hz signal, produced at the output of inverter 24*a*, is 180° out of phase with the 32 Hz signal produced at the output of inverter 22 and applied to the common electrode of the display cell. Accordingly, in response to a HIGH level segment drive signal, a particular display cell is energized by applying a drive signal to the segment electrode that is the same frequency as the drive signal applied to the common electrode of the display cell but out of phase therewith by 180°.

In addition to the AC driving of each of the display cells, two features that are also included in driving circuits of the type known in the art, is the flickering of the digits being corrected by the correction control circuit and an inspection signal that can be applied to all of the segment electrodes in order to insure that each of the display cells, comprising the liquid crystal digital display, are operative. To this end, flicker signals $FL_1$ through $FL_n$ are respectively applied through NOR gates 25*a* through 25*n* to AND gates 26*a* through 26*n* in order to effect flickering of the particular display digit being corrected thereby. The flicker signals have a frequency of 2 Hz and are adapted to flicker the display cells associated with a particular digit in order to provide an indication to the wearer of the wristwatch of the particular timekeeping counter being corrected. In order to inspect the digital display, in the manner noted above, a HIGH level excitation signal $S_6$ is applied to EXCLUSIVE OR gate 21 and is further applied through NOR gates 25*a* through 25*n* to thereby apply a HIGH level input signal to EXCLUSIVE OR gates 23*a* through 23*n*. Accordingly, when the excitation signal is a HIGH level signal, the $\overline{32\ Hz}$ signal, produced by inverter 20, is inverted by each of the EXCLUSIVE OR gates 23*a* through 23*n* to thereby excite each of the segment electrodes and thereby render all of the segments of each display digit visually distinguishable. It is further noted that when the excitation signal $S_6$ has a LOW level, it will have no effect on the operation of the display driving circuitry.

The operation of the display driving circuit, depicted in FIG. 2, is illustrated by the wave diagrams depicted in FIG. 3. It is noted that the wave diagrams, illustrated in FIG. 3, demonstrate the operation of the driving circuit when the excitation signal $S_6$ and the flicker signals $FL_1$ through $FL_n$ are LOW level signals. Accordingly, the common output (COM.OUT) signal is a 32 Hz signal. Decoded output signal $S_7$ is a segment signal such as SEG (1-a) for exciting a particular display cell. In response to a segment signal $S_7$ being applied to AND gate 26*a*, a segment output signal $S_8$ (SEG.OUT) is applied at the output of drive inverter 24*a* for effecting energization thereof. When segment drive signal $S_7$ is a LOW level signal, the 32 Hz segment output signal $S_8$ is in phase with the 32 Hz common output signal applied to the common electrode of the display cell. Similarly, when the segment drive signal $S_7$ is a HIGH level signal, the segment output signal $S_8$ is a 32 Hz signal that is out of phase with respect to the 32 Hz common output signal to thereby selectively energize the display cell defined by the segment electrode coupled to inverter 24*a* and the common electrode. Moreover, the signal $S_9$, illustrated in FIG. 3, represents the potential difference defined between the common electrode and segment electrode produced as a result of the common output signal and segment output signal being applied to the display cell. Specifically, during the period $t_c$, when a LOW level decoded segment signal $S_7$ is applied to AND gate 26*a*, the segment output signal $S_8$ is in phase with the 32 Hz common output signal and, accordingly, there is no potential difference between the common electrode and segment electrode of the display cell. However, during the interval $t_a$, when a HIGH level segment drive signal $S_7$ is applied to AND gate 26*a*, the segment output signal $S_8$ remains at a HIGH level, at the time that the common output signal is at a LOW level, thereby defining a predetermined potential difference that is sufficient to render the liquid crystal display cell visually distinguishable. Furthermore, during the interval $t_b$, the segment output electrode is out of phase with respect to the common electrode and thereby once again defines a sufficient predetermined potential difference of an opposite polarity to that obtained during the interval $t_a$, but sufficient to render the display cell visually distinguishable. Accordingly, as long as the segment output signal $S_8$ remains out of phase with respect to the common output signal, a sufficient potential difference of alternating polarity is generated across the display cells to thereby effect an AC driving thereof. However, once the segment signal $S_7$ is returned to a LOW level, the segment output signal $S_8$ is, once again, disposed in phase with the common output signal to thereby produce no potential difference across the display cell and thereby permit same to be substantially transparent and, hence, not perceived by the human eye.

Reference is now made to an equivalent circuit of a liquid crystal display cell drive circuit operating in the manner illustrated in FIG. 3. A DC voltage supply 27 represents the boosted voltage applied to the display cell in the wristwatch, illustrated in FIG. 1. Two-position switch 33 and resistors 28 and 30 represent an equivalent circuit of C-MOS drive inverter 24*a*. To this end, SEG switch 33 represents the switching property of the C-MOS inverter, and resistor 28 represents the equivalent ON channel resistance of the P-channel transistor and resistor 30 represent the equivalent ON channel resistance of the N-channel transistor. The C-MOS drive amplifier 22, coupled to the common electrode, is represented by two-position switch 34, resistor 29 and resistor 31. Specifically, the two-position switch 34 represents the manner in which the COM electrode is turned ON and OFF by the C-MOS amplifier, with the resistance 29 representing the equivalent ON channel resistance of a P-channel transistor and the resistance 31 representing the equivalent resistance of a N-channel transistor. Finally, capacitor 32 represents the equivalent capacitance defined by an FE-type liquid crystal display cell and represents the characteristic of a liquid crystal display cell that is utilized in the instant invention to reduce the current required to effect driving of the liquid crystal display cells in an AC drive mode.

Reference is now made specifically to FIG. 4*a*, wherein the equivalent circuit illustrates the manner in which the display cell is driven during the interval $t_a$, illustrated in FIG. 3. When the common electrode is referenced to a low potential, and the segment electrode is referenced to a high potential, the SEG switch 33 is coupled through equivalent P-channel resistance 28 to the positive terminal of the voltage supply 27 and the common electrode switch 34 is coupled through the N-channel equivalent resistance 31 to the negative side of the power supply, to thereby develop across equivalent capacitance 32 a sufficient potential to render the liquid crystal display cells visually distinguishable. Similarly, during the interval $t_b$, illustrated in FIG. 3, the liquid crystal display cell is also driven by an opposite polarity predetermined potential defined between the common electrode and segment electrode, in the manner illustrated by the equivalent circuit illustrated in FIG. 4*b*. Specifically, SEG switch 33 is coupled through the equivalent N-channel resistance 30 to the negative side of the power supply 27 and the COM switch 34 is coupled through the P-channel equivalent resistance 29 to the positive side of power supply 27. By this arrangement, a potential difference substantially equal to the voltage delviered by the power supply 27, but of an opposite polarity to the potential difference applied during the interval $t_a$, is applied and hence charges the equivalent capacitance 32 of the display cell. It is noted however, that during the interval $t_c$, when the liquid crystal display cell is not to be driven, as is illustrated in FIGS. 4*c* and 4*d*, both the segment electrodes and common electrodes are coincidentally coupled to the same side of the power supply to thereby porduce a net zero potential difference therebetween, and thereby prevent current from running through the equivalent capacitance of the display cell, to thereby prevent the display cell from becoming visually distinguishable.

It is noted that the current consumed by the equivalent capacitance 32, when the display cell is rendered visually distinguishable, can be readily determined by referring to the equivalent circuits depicted in FIGS. 4*a* and 4*b*. Specifically, when the equivalent capacitance 32 is coupled in series with the equivalent resistances to opposite sides of the power supply, the charging and discharging of the equivalent capacitance 32 defines current transients. Moreover, the following equations obtain at the time that the display cell is charged:

$$(R\cdot(d_q/dt)+q/c=E$$

$$q=qs+qt$$

$$qs=C\,E$$

$$qt=A\cdot e^{-t/CR}$$

Where R is the sum of the equivalent resistances 28 and 31 of the P-channel and N-channel MOSFET transistors or the sum of the equivalent resistances 39 and 30 of the P-channel and N-channel transistors coupled to the segment electrode and common electrode, respectively: C is the equivalent capacitance of the liquid crystal display cell; E is the voltage produced by the power supply 27, qs is the electric charge when the display cell is in a regular condition; qt is the electric transient charge in the display cell; and A is an integrating constant.

Accordingly, based on the foregoing equations, the following general relationship is obtained:

$$q=qs+qt=CE+A\cdot e^{-t/CR}$$

Wherein the electric charge −CE is of an opposite polarity to the electric charge in the equivalent capacitance 32 at the instant that the switching condition of the drive circuit, illustrated in FIG. 4*a*, is switched over to the switching condition illustrated in the equivalent circuit, depicted in FIG. 4*b*. Thus, at the time (t=0) that the display cell is switched over during AC driving, the charge at the initial condition is minus C·E. Thus:

$$-C\cdot E=C\cdot E+A$$

$$A=-B\,2\cdot C\cdot E$$

Accordingly, if the integrating constant is $-2\cdot C\cdot E$, the equation for q noted above can be represented as follows:

$$q = C\cdot E - 2\cdot C\cdot E\cdot e^{-\frac{t}{CR}} = CE\,(1-2\,e^{-\frac{t}{CR}}$$

and the current i is:

$$i=\frac{d_q}{d_t}=\frac{d\left\{C\cdot E(1-2\,e^{-\frac{t}{CR}})\right\}}{dt}=\frac{2E}{R}\,e^{-\frac{t}{CR}}$$

Wherein i is the charging current.

The energy W (J) supplied to the equivalent capacitance and equivalnet resistances by the power supply 27 from the instant t=0 that the display cell is switched over during AC driving thereof to a time t=∞ is represented as follows:

$$W=\int_0^\infty E\cdot i\,dt=\int_0^\infty E\,\frac{2E}{R}\,e^{-\frac{t}{CR}}\,dt=2\cdot C\cdot E^2\,(J)$$

Moreover, the energy $W_R$ (J) consumed by the equivalent resistance is:

$$W_R=\int_0^\infty R\cdot i^2\,dt=\int_0^\infty\left(\frac{2\cdot E}{R}\,e^{-\frac{t}{CR}}\right)^2 dt=2\,C\cdot E^2\,(J)$$

And, finally, the energy $W_C$(J) consumed by the equivalent capacitance of the liquid crystal display cell is computed as follows:

$$W_C = \int_0^\infty \frac{q}{c} i \cdot dt$$

$$= \int_0^\infty \frac{2 \cdot E^2}{R} (e^{-\frac{t}{CR}} - 2e^{-\frac{2t}{CR}}) dt$$

$$= 0$$

It is noted that a time constant $\tau$ (CR) of 0.1 ms is obtained when C is on the order of 500 to 1,000 $p^F$ when the area of the segment electrode is 0.5 $cm^2$ and the equivalent resistance is on the order of 100 KΩ, when all of the segment electrodes are energized. It is noted that a 0.1 ms time constant is short when compared with the time period of a 32 Hz signal. Thus, for the parameters set forth above, the capacitor C is charged to a saturated condition within each half cycle of each AC driving within about 15.6 ms.

From the foregoing, it has been determined that each half cycle that the display cell is driven results in an energy consumption of $2 \cdot C \cdot E^2$ (J).

Specifically, at the time that the display cell is saturated, an electric charge having an opposite polarity to the initial electric charge, but the same magnitude as the initial electric charge, is required to charge the equivalent capacitance of the display cell. As demonstrated above, the energy consumed by the liquid crystal display cell, represented by the energy required to charge the liquid crystal equivalent capacitance 32, balances out to zero energy. Accordingly, any energy that is actually lost is accounted for by the thermal loss resulting from the channel resistances defined by the liquid crystal driving transistors. Energy in the amount of $2 \cdot C \cdot E^2$ (J) is consumed in order to charge the equivalent capacitance of the DC cell to the same magnitude as the voltage supplied by the power supply even though the amount of electric charge required to charge the equivalent capacitance C of the liquid crystal display cell is only C·E coulombs. However, in order to charge the liquid crystal display cell to the opposite polarity every half cycle in an AC driving mode, first, the previous capacitive charge stored during the previous half cycle must be discharged. Thus, in a prior art AC driving mode of the type illustrated in FIG. 3, an energly level of $2 \cdot C \cdot E^2$ (J) is consumed because the charge stored in the DC cell, as a result of the capacitive characteristics thereof, must be discharged through the power source prior to the charging of the DC cell to the opposite polarity during the next half cycle.

The instant invention contemplates that there is no loss in energy in the power supply 27 if the electric charge stored by the capacitive characteristic of the DC cell is discharged to the same power supply since the discharge is merely charged from the power supply that is stored in the DC cell. The loss, however, results from the direction of current flow into the power supply 27 which is in a direction opposite to the direction that the capacitor is discharged at the beginning of the next half cycle. When the current flow is in a direction opposite to the charging current, the power source loses energy even though the charge stored in the capacitor is being discharged in the direction of the power supply. It has been found that energy losses in the power supply, at the time of discharge, are on the order of $C \cdot E^2$ (J). The instant invention is, therefore, directed to reducing the amount of energy consumed by the power supply by discharging the electric charge stored by the equivalent capacitance of the liquid crystal display cells without discharging same through the power supply. Specifically, a closed charging loop that does not include the power supply permits the charge, stored by the capacitance of the liquid crystal display cell, to be dissipated prior to the charging of the display cell to the opposite polarity.

To this end, reference is made to FIG. 5, wherein an equivalent liquid crystal driving circuit, of the type to which the instant invention is directed, is depicted, like reference numerals being utilized to denote like elements described above. It is noted that FIG. 5*a* represents the condition wherein a predetermined potential difference is defined across the DC cell (capacitance 32) in the same manner as illustrated in FIG. 4*a* and described above. However, in accordance with the instant invention, before the liquid crystal display cell is charged to an opposite polarity, as illustrated in FIG. 5*b*, the N-MOS transistor (31) on the common electrode side remains turned ON, and the P-MOS transistor (28) is turned OFF and the N-channel transistor (30) on the segment electrode side of the display cell is turned ON, to thereby define a closed discharging loop that does not include the power supply 27. Accordingly, the charge stored in the display cell (equivalent capacitance 32) is discharged through a closed loop including the N-channel MOSFET of the SEG driving inverter circuit and the N-channel MOSFET of the COM driving inverter. Moreover, once the electric charge stored in the liquid crystal display cell is discharged, the N-channel transistor on the COM side of the display cell is turned OFF and the P-channel transistor on the COM side (equivalent resistance 29) is turned ON, to thereby reference the SEG to the low side of the DC power supply 27 and the COM electrode of the DC display cell to the high side of the power supply 27 and thereby define a potential difference across the liquid crystal display cell sufficient to render same visually distinguishable. Thereafter, at the beginning of the next half driving cycle, as illustrated in FIG. 5*d*, the P-channel transistor on the COM electrode side of the liquid crystal display cell remains ON and the inverter on the SEG electrode side is switched to thereby turn the N-channel transistor OFF and the P-channel transistor ON. Accordingly, a closed discharging loop, including the P-channel transistors of the SEG driving inverter and the COM driving inverter and excluding the DC power supply 27, is provided to thereby permit the charge stored in the liquid crystal display cell to be discharged prior to being once again charged to an opposite polarity to render same visually distinguishable. Thereafter, the driving circuitry would be returned to the state illustrated in FIG. 5*a*, to thereby commence charging of the liquid crystal display cell in order to continue the driving of same in an AC driving mode. It is noted that FIGS. 5*a* through 5*d* illustrate the equivalent circuits formed when a particular display cell is alternately driven in an AC driving mode in accordance with the instant invention. Moreover, the driving circuit is operated in the same manner illustrated in FIGS. 4*c* and 4*d* when the particular display cell is not energized.

It is further noted that the bilateral current characteristic of the drain in a field effect transistor and the time constants thereof render same particularly suitable for use in accordance with the instant invention. Specifically, if the potential applied to the field effect transistors is sufficient to turn same ON, the direction of current flow between the drain electrode and source electrode is bilateral and, hence, current flow is effected in either direction. This characteristic of MOS-FET's is well known and results from the symmetrical formation of the drain and source during fabrication of the MOS-FET. Moreover, this bilateral characteristic of the transistors permits the current flow from the source to the drain, at the time that the liquid crystal display cell is discharged.

With respect to the time constant of the MOSFETs at the time that the charge stored in the liquid crystal display cell is to be discharged, the ON resistance of the MOSFET at the time of discharge is about the same as the equivalent resistance of the MOSFET at the time that the liquid crystal display cell is charged. Therefore, if the equivalent capacitance of the liquid crystal display cell is on the order of 1,000 $P^F$ and the ON resistance of the MOSFET is on the order of 100 KΩ, a time constant of 0.1 ms is required. Accordingly, the ON resistance of the transistors in the discharge loop amounts to no more than 1 MΩ, so that the period required to discharge the liquid crystal display cell can be on the order of 0.5 ms.

In order to quantitatively demonstrate the reduction in current consumption effected by the instant invention, it is noted that if the equivalent capacitance C of the liquid crystal display cell, at the time that same is discharged, namely, at a time t=0, the following relationship exists:

$$q=C\cdot E+A\cdot e^{-t/CR}$$

$$O=C\cdot E+A$$

$$A=-C\cdot E$$

In such event, that the constant A=−C·E, the following charge equation results:

$$q=C\cdot E(1-e^{-t/CR})$$

The current flow i is therefore:

$$i=dq/dt=E/R\cdot e^{-t/CR}$$

In light of the foregoing, all of the energy W (J) supplied to the equivalent capacitance C and equivalent resistance R by the power source 27 during the time interval t from 0 to ∞ can be calculated as follows:

$$W=\int_0^\infty E\cdot i dt = \int_0^\infty E\cdot\frac{E}{R}e^{-\frac{t}{CR}}dt = C\cdot E^2 (J)$$

In such event, the energy $W_R$ (J) consumed in the equivalent resistance R is:

$$W_R=\int_0^\infty R\cdot i^2 dt = \int_0^\infty R\cdot\left(\frac{E}{R}e^{-\frac{t}{CR}}\right)^2 dt = \tfrac{1}{2}C\cdot E^2 (J)$$

And, the energy $W_C$ (J) stored (or consumed) by the equivalent capacitance C of the liquid crystal display cell is determined as follows:

$$W_C=\int_0^\infty \frac{q}{C}\cdot i dt = \int_0^\infty \frac{E^2}{R}\left(e^{-\frac{t}{CR}}-e^{-\frac{2t}{CR}}\right)dt = \tfrac{1}{2}C\cdot E^2 (J)$$

The instant invention is therefore characterized by the energy consumed in the liquid crystal display cell and the driving circuit during each AC half driving cycle equalling $C\cdot E^2$ (J), which reduces by one half the amount of current consumed by a conventional liquid crystal display driving circuit of the type illustrated in FIG. 2.

Figure 7:
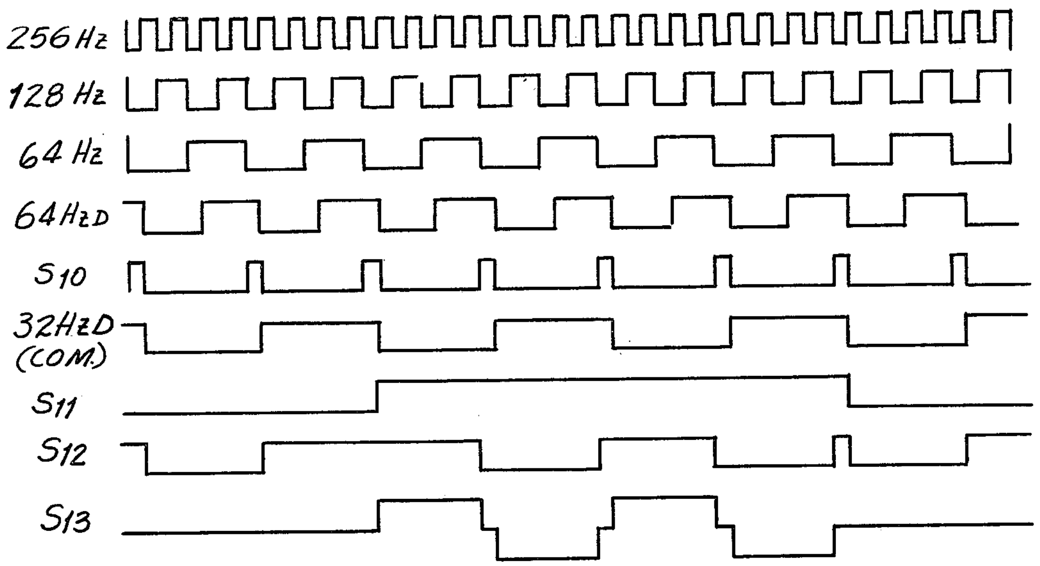
FIG. 7 is a wave diagram illustrating the operation of the liquid crystal display driving circuit depicted in FIG. 6.

Reference is now made to FIG. 6, wherein a driving circuit for effecting the AC driving of a liquid crystal display cell, in the manner illustrated in FIGS. **5*a* through 5*d*, is depicted, like reference numerals being utilized to denote like elements described above. It is noted that the addition of a D-type master flip-flop 35 intermediate the master-slave flip-flop 18 and master-slave flip-flop 19 and NOR gate 36 and OR gate 37 is the only additional circuitry that is required to be added to the driving circuit illustrated in FIG. 2, in order to obtain the improved AC mode driving of the instant invention. Specifically, by utilizing master flip-flop 35, NOR gate 36 and OR gate 37, the voltage level of the COM.OUT signal and the SEG.OUT signals are rendered equal each time that the 32 Hz signal changes direction, by applying to NOR gate 36 the 64 HzD delayed signal produced by flip-flop 35 which signal is delayed by 2 ms. The improved AC mode driving is discussed in greater detail below with respect to FIG. 7, which illustrates the sequence of operation of the drive circuit illustrated in FIG. 6**.

In response to the 64 HzD signal produced at the Q output of D flip-flop 35, and the 64 Hz signal applied at the Q output of flip-flop 18 to NOR gate 36, and output signal $S_{10}$ having a pulse width of 2 ms is applied to OR gate 37. A decoded signal $S_{11}$ is selectively applied to the AND gates **26*a* through 26*n* to selectively energize display cell segments in the manner discussed above. By way of example, FIG. 6 illustrates the driving of the display cell comprised of common electrode and segment electrode driven by the inverters 22 and 24*a* respectively. It is noted that the signal $S_{12}$ is the SEG.-OUT signal produced at the output of the drive inverter 24*a*. Specifically, the signal $S_{13}$ represents the relative potential difference defined between the common electrode and the segment electrode and is formed in the following manner. When the segment signal $S_{11}$ is a HIGH level signal, the particular segment defining a display cell to which same is applied will be rendered visually distinguishable. The SEG.OUT signal $S_{12}$ will be of an opposite phase to the 32 Hz signal COM.OUT applied to the common electrode of the display cell. However, as the result of the 2 ms signal $S_{10}$ applied at the output of OR gate 37 to the NOR gate 25, the SEG.-OUT signal $S_{12}$ is changed in phase at a time period 2 ms earlier than the change of phase of the 32 Hz signal applied to the common electrode of the display cell. Accordingly, as illustrated by the potential difference signal $S_{13}$, during each 2 ms delay period, there is no potential difference between the common electrode and segment electrode, thereby providing a period in which the common electrode and segment electrode are referenced to the same potential, to thereby define the closed discharging loops discussed in detail above with respect to FIGS. 5***b* and 5*d*. Thus, by the addition of three operative elements, to wit, the D master flip-flop 35, NOR gate 36 and OR gate 37, the energy required to charge each drive cell is reduced in half and it is only necessary to add aproximately twenty circuit elements to a circuit chip that would occupy within the range of 0.5% to 1% of the entire circuit area of an integrated circuit chip in order to incorporate the improved driving circuit of the instant invention into a small-sized electronic instrument, such as a wristwatch.

Figure 8:
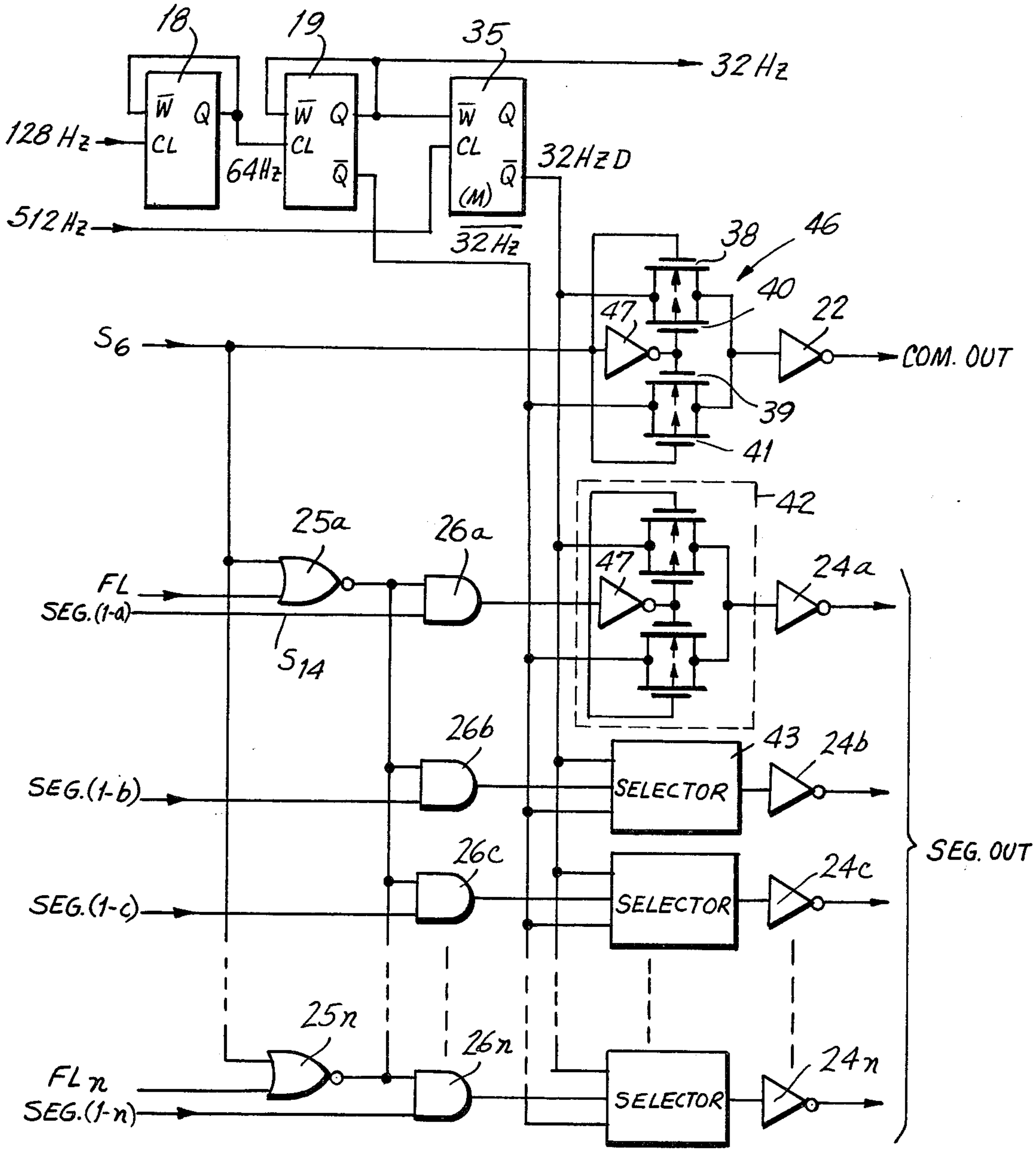
FIG. 8 is a block circuit diagram of a liquid crystal display driving circuit constructed in accordance with an alternate embodiment of the instant invention.

Reference is now made to FIG. 8, wherein a further embodiment of a driving circuit, constructed in accordance with the instant invention, is depicted, like reference numerals being utilized to denote like elements depicted above. The 32 Hz signal produced by flip-flop 19 is applied to the write $\overline{W}$ input of D-type flip-flop 35 and in response to a 512 Hz signal applied to the clock CL input of the D-type flip-flop 35 from a higher frequency divider stage, a 32 Hz signal is produced at the $\overline{Q}$ output of the flip-flop and applied to a selector circuit, generally indicated as 46. Specifically, the 32 HzD signal produced at the output $\overline{Q}$ of flip-flop 35 is delayed with respect to the $\overline{32\ Hz}$ signal produced at the $\overline{Q}$ output of flip-flop 19 and is applied through a first transmission gate comprised of series-connected N-channel transistor 38 and P-channel transistor 40 and an inverter 22 to a common electrode as a COM.OUT signal. Additionally, the $\overline{32\ Hz}$ signal produced by flip-flop 19 is applied through a second transmission gate comprised of MOS transistors 39 and 41 and inverter 22 to the common electrode of the display cell as a COM.OUT signal. The selection of the transmission gate to be operated is effected by an inverter 47, which inverter is adapted to receive the excitation signal $S_6$ which is normally a LOW level unless each of the segments comprising the liquid crystal display cell is to be energized in the same manner discussed above. Each of the segment signals SEG (1-a) through SEG (n-g) are applied through AND gates 26*a* through 26*n* to selector circuits 42, 43, 44 and 45, which selector circuits are respectively coupled to drive inverters 24*a* through 24*g*. Drive inverters 24*a* through 24*g* define the SEG.OUT signals to be applied to each of the segment electrodes of the liquid crystal display cell in the same manner noted above. Moreover, selector circuits 42 through 45 are the same as the selector circuits coupled to the common electrode inverter driving circuit 22 in order to function in the same manner. It is further noted that the selector circuits can be formed of a clocked gate or an AND-OR gate in lieu of the transmission gates illustrated in FIG. 8.

Figure 9:
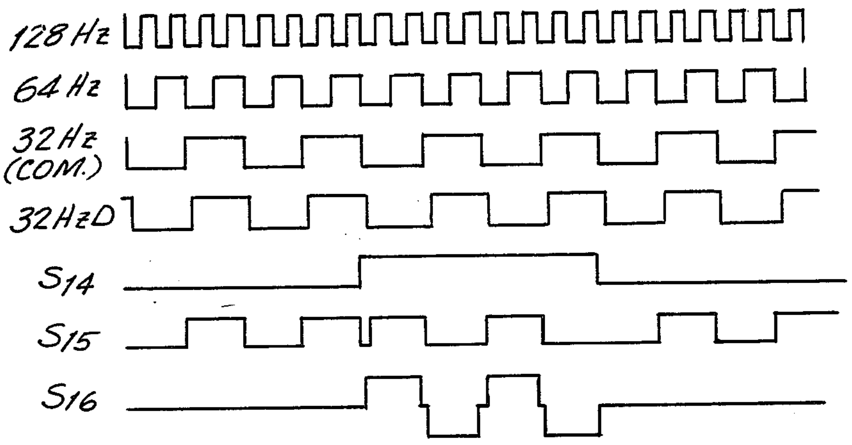
FIG. 9 is a wave diagram illustrating the operation of the liquid crystal display driving circuit depicted in FIG. 8.

The operation of FIG. 8 is illustrated in the wave diagram depicted in FIG. 9. Specifically, one of the segment select signals SEG (1-a) through SEG (1-g), such as signal $S_{14}$ is produced by a decoder circuit and applied to an AND gate 26*a* in order to selectively energize the segment electrode coupled to drive inverter 24*a* when a HIGH level signal $S_{14}$ is applied to the AND gate 26*a*. The SEG.OUT signal $S_{15}$ is therefore applied to the segment electrode in order to selectively render the liquid crystal display cells visually distinguishable. Moreover, the potential difference between the common electrode and a segment electrode when same is selectively energized, is illustrated as signal $S_{16}$.

When the excitation signal $S_6$ is a LOW level signal, the $\overline{32\ Hz}$ signal produced by flip-flop 19 is applied through the second transmission gate comprised of N-channel transistor 39 and P-channel transistor 41 to the inverter 22. Accordingly, a 32 Hz COM.OUT signal is applied to the common electrode of the display cell. When the output of AND gate 26*a* is a HIGH level signal, for the purpose of selectively energizing the display cell, the signal 32 HzD, produced by flip-flop 35, is applied through the second transmission gate of selector 42 to the drive inverter 24*a* to thereby define a SEG.OUT signal $S_{15}$ that is delayed with respect to the 32 Hz signal applied to the common electrode. As a result of the 32 HzD signal produced by D-type flip-flop 35, the COM.OUT signal is advanced with respect to the SEG.OUT signal $S_{15}$. Accordingly, for a portion of each driving interval, defined by the amount that the SEG.OUT signal is delayed with respect to the 32 Hz signal applied to the common electrode, the charge stored in the display cell as a result of the capacitance characteristic thereof, is discharged in a closed loop of the type detailed above, in order to obtain the same type of operation discussed above with respect to the exemplary embodiment illustrated in FIG. 6.

Reference is now made to FIGS. 10*a* and 10*b*, wherein the respective current wave forms of a conventional AC mode driving circuit and an AC mode driving circuit constructed in accordance with the instant invention are respectively depicted. The wave forms, illustrated in FIGS. 10*a* and 10*b*, are based on actual measurements. In both Figs. the portion of the curves that are free of oblique lines represent a current flow from the DC power supply. A driving circuit, constructed in accordance with the instant invention, reduces the current peak by one half as compared with a conventional driving circuit of the type depicted in FIG. 2. To this end, the portion of the curve, illustrated in FIG. 10*b*, having oblique lines represents the current discharged by the closed loop defined by the like channel transistors of the COM driving inverter and the SEG driving inverter being turned ON, to thereby exclude the power supply from the closed discharging loop.

It is noted that a constant current flow is effected from the time that the transient phenomenon ends and the display is disposed in a saturated condition. The discharge time constant equals the total ON channel resistance of the COM driving inverter and the SEG driving inverter and the equivalent capacitance C of the liquid crystal display cell. This current value is on the order of 0.2 to 0.3 $\mu$A. Moreover, as a result of the electric charge of the liquid crystal display cell being discharged, and the current flow being gradually reduced over a period of time, a zero current flow will be effected about one second later, thereby explaining the minimum current value that occurs after the step voltage is applied. In view thereof, the following premises can be established based on this current. Since the FE-type liquid crystal molecule is provided with dielectric anisotropy, the molecule moves so that the dielectric constant may be elevated in the direction of the electric field, when a potential difference develops between the opposed COM electrode and SEG electrode. It is noted, however, that a rapid response cannot be obtained since the movement of the liquid cystal molecules is slow and it therefore takes on the order of 100 ms to several seconds for the liquid crystal molecules to be arranged in a uniform direction. In this time interval, the dielectric constant keeps increasing thereby providing a likewise increase in the equivalent capacitance of the liquid crystal display cells. The electric charge Q, stored in a capacitor, equals C·E. Accordingly, if the charge C is increased over a longer interval of time, the amount of electric charge required to charge the display cell is likewise increased over a longer period of time. Since the current i flowing through the display cell, as a result of the capacitance characteristic thereof, is the fraction dq/dt, there is a flow of current through the liquid crystal display cell even after the charging period defined by the time constant represented by CR.

The liquid crystal driving current can be calculated in the following manner, taking into consideration the current that results from the aforementioned increase in the equivalent capacitance of the liquid crystal display cells. For the following condition wherein an AC driving frequency of 32 Hz, an equivalent capacitance of the liquid crystal display cell of 1,000 $p^F$ (a value actually measured when all the segments are excited), a current generated by the increase in capacitance of 0.3 A, the time required for charging (discharging) will be 0.3 ms for a charging voltage of 31.1 V.

It is noted that the average current consumption at the time that the liquid crystal display is driven equals the sum total of the electric charge per second needed to effect charging of the liquid crystal display cells and the sum of the electric charge consumed as a result of the increase in the capacitance. From the aforenoted calculations, it is apparent that the energy needed to charge the liquid crystal display cell equals $2CE^2$ (J) each time that a liquid crystal display cell is charged in a conventional manner and only $C{\cdot}E^2$ (J) utilizing a driving circuit in accordance with the teachings of the instant invention. Thus, a charge of 2C·E coulombs and CE coulombs, respectively, is consumed each time a display cell is charged. The number of times that a DC display cell is charged during a single second is twice as many as the frequency of the AC driving signal, namely, for a 32 Hz signal, sixty times. Thus, the total amount of electric charge consumed by the increase in capacitance is $0.3\ \mu A \times (15.63\ ms - 0.3\ ms - tms) \times 64$ coulombs when the compulsory charging time (the time interval when the common electrodes are referenced to a voltage level to render the display cell visually distinguishable) is t (ms), assuming that the capacitance does not increase for the liquid crystal charging transient time (0.3 ms).

The current consumption of a liquid crystal display cell, calculated in accordance with the formula detailed above, is illustrated in Table 1 below. The Table 1, the current consumption at the time t=0 is the current consumption utilizing a conventional AC mode driving circuit. If the current consumption utilizing a conventional driving circuit is assumed to be 100%, the ratio of current consumption in each compulsory discharge time t is represented as an i ratio. The effective voltage ratio is then the value of $(15.63\ ms - t\ ms/15.63\ ms) \times 100$ taking the effective voltage in the conventional driving method at t=0.

Table 1

| t (ms) | Current Consumption (A) C charging | C increase | total | i Ratio (%) | Effective Vol. Ratio (%) |
|---|---|---|---|---|---|
| 0 | 0.397 | 0.294 | 0.691 | 100.0 | 100.0 |
| 0.49 | 0.198 | 0.285 | 0.483 | 69.9 | 96.9 |
| 0.98 | 0.198 | 0.267 | 0.465 | 67.3 | 93.8 |
| 1.95 | 0.198 | 0.257 | 0.455 | 65.8 | 87.5 |
| 3.91 | 0.198 | 0.220 | 0.418 | 60.5 | 75.0 |
| 7.81 | 0.198 | 0.145 | 0.343 | 49.6 | 50.0 |

It is generally recognized that the contrast of a liquid crystal display cell is proportional to the effective voltage applied thereacross. A compulsory discharge time of 7.81 ms is equal to about one half of the ½ cycle 15.63 ms of a 32 Hz AC driving frequency, as demonstrated by Table 1. Although the current consumption is reduced in half, the effective voltage applied to the liquid crystal display cell is also reduced in half, thereby rendering same ineffective. Accordingly, an interval of 0.49 ms which equals, or is a little larger than, time constant of the discharging cycle is suitable as the compulsory discharge time t during which the voltage of the common electrode and the segment electrode are maintained at the same level in order to define a closed discharge loop.

Table 2 below represents actual current consumption measurement data taken under the following conditions; the AC driving frequency is 32 Hz, E is 3.1 V, the average current consumption is with a 3.1 V voltage applied to the liquid crystal display cells, and the liquid crystal display cell is of the ester type utilized in electronic wristwatches. By comparing the aforementioned calculated values, illustrated in Table 1, it can be seen that same are in substantial agreement with the measured values, illustrated in Table 2.

Table 2

| LCD NO | Drive Circuit In Accordance With Instant Invention t = 3.91ms | t-1.95ms | t = 0.98ms | t = 0.49ms | Conventional Drive Circuit |
|---|---|---|---|---|---|
| 1 | 0.47μA | 0.50μA | 0.52μA | 0.53μA | 0.77μA |
| 2 | 0.46 | 0.49 | 0.50 | 0.51 | 0.77 |
| 3 | 0.50 | 0.53 | 0.55 | 0.56 | 0.80 |
| 4 | 0.34 | 0.36 | 0.38 | 0.42 | 0.605 |
| 5 | 0.54 | 0.58 | 0.60 | 0.62 | 0.88 |
| i | 0.46μA | 0.49μA | 0.51μA | 0.53μA | 0.765μA |
| % | 60.1% | 64.1% | 66.7% | 69.3% | 100% |

Referring now to FIG. 11, measures value comparing the voltage to the liquid crystal contrast characteristic when the compulsory discharge time t is varied, is depicted. The abscissa does not represent the effective voltage but, instead, the voltage of the power source utilized to energize the electronic instruments. The effective voltage is equal to the power supply voltage at the time that t is equal to zero, and as t increases, the effective voltage is reduced proportionally. As can be seen in FIG. 11, the longer the compulsory discharge time t, the worse the contrast obtained. It has been found that the effective voltage and the contrast correspond to each other and that the contrast rarely deteriorates if t is kept small.

Accordingly, the instant invention is particularly characterized by an AC mode driving circuit for a liquid crystal display cell that effects a reduction in the power consumed by as much as one half. Specifically, the instant invention recognizes that the electric charge in a saturated liquid crystal display cell is different because the electric charge (q=C·E) is charged in the saturated liquid crystal display cell as a result of a transient phenomenan. If the amount of electric charge does not differ, a difference in contrast of the saturated field-effect type liquid crystal display cell cannot be noticed when same is driven in accordance with the instant invention.

However, in order to assure that no difference in contrast occurs, that no loss in benefit is obtained by saving an amount of energy equal to $C \cdot E^2$, it is imperative that the period required to obtain saturation is short. Stated otherwise, a short transient time on the order of 100 μs must be provided for effecting a transient current flow. Thus, if the transient current flows for a period about twice as long as a conventional method, the length of the transient time, during which discharge is effected, does no contribute to a deterioration in the contrast of the liquid crystal display cells because the response time of the liquid crystal display cells are relatively slow (on the order of several 10 ms). The contrast of the liquid crystal display is proportional to the effective voltage applied to the liquid crystal. However, the instant invention requires a longer time to discharge the electric charge of the liquid crystal and thereafter charge same in an opposite polarity, and the voltage is not applied to the liquid crystal during this period. Accordingly, as the effective voltage is proportionally reduced, although the contrast can be deteriorated, as demonstrated by the comparison figures detailed above, such deterioration is negligible.

Although the AC mode driving circuit of the instant invention has been described for use in a quartz crystal electronic wristwatch, the instant invention is clearly applicable to all miniaturized electronic instruments having liquid crystal displays that place a premium on low power consumption. Moreover, an increase in current consumption, resulting from an increase in the liquid crystal equivalent capacitance, can be reduced by applying a potential difference between the common electrodes and segment electrodes for the period of time necessary to charge the liquid crystal display cell and by opening the segment electrode during the remaining portion of the interval determined by the AC driving frequency. Stated otherwise, the P-channel and N-channel transistors of the driving inverter can both be opened during the portion of the drive interval that the capacitor is to be discharged so that the charge stored in the display cell is discharged through circuit elements other than the power supply.

It is further noted that a reduction of the potential difference between the common electrode and segment electrode cannot be disregarded if the capacitance is increased. It is preferred that when the potential difference defined between the common electrode and the segment electrode for the drive interval of time is a quarter or a half of the charging time of 15.6 ms, that the segment electrode be disconnected for the remaining portion of the drive interval. By this arrangement, current consumption is reduced as the capacitance is increased, and the charge stored in the liquid crystal display cell is discharged in a closed loop in which the power supply is not included.

Accordingly, the instant invention can effect a reduction in the current required to effect a driving of a liquid crystal display cell by adding a few circuit elements to the driving circuit. Moreover, by utilizing an AC mode driving circuit, of the type to which the instant invention is directed, the useful life of a DC battery in an electronic instrument will be extended.

It will thus be seen that the objects set forth above, among those made apparent from the preceding description, are efficiently attained and, since certain changes may be made in the above construction without departing from the spirit and scope of the invention, it is intended that all matter contained in the above description or shown in the accojpanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In a driving circuit for an electro-optical display cell, each said display cell including a common electrode, a segment electrode spaced from said common electrode and visually distinguishable means disposed between said common electrode and segment electrode, said visually distinguishable means being adapted to become visually distinguishable in response to said common electrode and said display segment electrode being referenced to opposite potentials so that a predetermined potential difference therebetween is defined, the improvement comprising first drive circuit means coupled to said common electrode for alternately referencing said common electrode between a first and second opposite potential for a predetermined interval of time, a second drive circuit means coupled to said segment electrode, said second drive circuit means being adapted to selectively reference said segment electrode to a potential having a polarity opposite to the potential of said common electrode to define a predetermined potential difference between said common electrode and said segment electrode for less than said predetermined interval of time, said second drive circuit means being further adapted immediately prior to each time that said segment electrode is selectively referenced to a potential having a polarity opposite to the potential of said common electrode to reference said segment electrode to substantially the same polarity and substantially the same potential as said common electrode to thereby permit said display cell to be discharged just prior to said predetermined potential difference being defined between said common electrode and segment electrode.

2. A driving circuit as claimed in claim 1, wherein said first drive circuit means includes a C-MOS driving inverter having a P-channel transistor and N-channel transistor coupled to said common electrode to said display cell, and said second drive circuit means including a second C-MOS driving inverter having a P-channel transistor and a N-channel transistor coupled to said segment electrode, said first drive circuit means and second drive circuit means being adapted to selectively turn ON like polarity transistors in said first and second C-MOS driving inverters so that said common electrode and said segment electrode are referenced to the same potential and polarity to thereby permit the display cell to be discharged at least through said like polarity transistors.

3. A driving circuit as claimed in claim 2, wherein said like polarity transistors in said first and second C-MOS drive inverters define a closed loop with said display cell in order to discharge the charge stored in said display cell when said like polarity transistors are turned ON.

4. A driving circuit as claimed in claim 1, wherein said first drive circuit means and said second drive circuit means are coupled in order to define a closed charging loop with said display cell when said segment electrode and said common electrode are referenced to the same potential and polarity to thereby permit the charge stored in said display cell to be discharged in said closed loop.

5. A driving circuit as claimed in claim 4, wherein said first circuit means is adapted to apply a first AC drive frequency signal having a predetermined frequency to said common electrode, said second drive circuit means being adapted to selectively apply to said segment electrode a second AC drive frequency signal having the same frequency as said first AC drive frequency signal, said second AC drive frequency signal being selectively inverted with respect to said first frequency drive signal and delayed by a predetermined interval with respect thereto, so that the period of delay defines the a second predetermined interval of time that said common electrode and said reference electrode are referenced to the same polarity and potential.

6. A driving circuit as claimed in claim 4, and including circuit means for producing a first intermediate frequency signal and a second intermediate frequency signal having the same frequency as the first intermediate frequency signal but delayed with respect to said first intermediate frequency signal by a third predetermined interval of time that is shorter than said first mentioned predetermined interval of time, the period of a half cycle of the frequency of said first and second intermediate frequency signals defining said second mentioned predetermined interval of time, said first drive circuit means in response to said second intermediate frequency signal being adapted to apply said second intermediate frequency signal to said common electrode, said second drive circuit means in response to said first intermediate frequency signal applied thereto being adapted to selectively invert said first intermediate frequency signal with respect to said second intermediate frequency signal and apply same to said segment electrode so that said segment electrode and common electrode are referenced to the same polarity and potential during said third predetermined interval of time and are respectively referenced to opposite potentials to define said predetermined potential difference during said second predetermined interval of time during each half cycle of said second intermediate frequency signal.

7. A driving circuit as claimed in claim 6, wherein said first drive circuit means includes inverter-gating means for receiving and inverting said second intermediate frequency signal and applying same to said common electrode, said second drive circuit means including selection means for selectively inverting and transmitting said first intermediate frequency signal to said segment electrode in response to a segment signal being applied thereto.

8. A driving circuit as claimed in claim 7, wherein said second drive circuit means includes a signal processing means for producing a pulse signal having a frequency equal to said first intermediate frequency signal, said pulse signal having a pulse equal in duration to said third predetermined interval of time, said selection means of said second drive circuit means in response to said pulse signal, said segment signal and said first intermediate frequency signal being adapted to selectively transmit and invert said second intermediate frequency signal to said segment electrode.

9. A driving circuit as claimed in claim 8, wherein said selection means includes a first combining gate for receiving the complement of said pulse signal and said segment signal and in response thereto produce a combined signal, and an inverting and shaping gate means for receiving said combined signal produced by said combining gate means and said first intermediate frequency signal and in response thereto for transmitting and inverting said second intermediate frequency signal to said segment electrode.

10. A driving circuit as claimed in claim 5, and including circuit means for producing a first AC intermediate frequency driving signal and a delay means for producing a second intermediate frequency driving signal having the same frequency as said first intermediate frequency driving signal but delayed with respect thereto by a third predetermined interval of time, said first circuit means being adapted to apply said first intermediate frequency signal to said common electrode of said display cell, said second driving circuit means being adpated to selectively apply and invert said second intermediate frequency signal to said segment electrode to thereby dispose said common electrode and segment electrode at substantially the same potential during the period that said first intermediate frequency timing signal and said inverted and delayed second intermediate frequency signal are referenced to the same potential, and for rendering the liquid crystal display cell visually distinguishable during the remaining portion of each half cycle of the first intermediate frequency signal that the inverted and delayed second intermediate frequency signal is out of phase with respect to said first intermediate frequency signal.

* * * * *